US012533631B2

(12) United States Patent
Graham et al.

(10) Patent No.: US 12,533,631 B2
(45) Date of Patent: Jan. 27, 2026

(54) OPTIMISING OPERATING CONDITIONS IN AN ABATEMENT APPARATUS

(71) Applicant: Edwards Limited, Burgess Hill (GB)

(72) Inventors: Michael Colin Graham, Burgess Hill (GB); Andrew James Seeley, Burgess Hill (GB); Duncan Michael Price, Burgess Hill (GB)

(73) Assignee: Edwards Limited, Burgess Hill (GB)

( * ) Notice: Subject to any disclaimer, the term of this patent is extended or adjusted under 35 U.S.C. 154(b) by 976 days.

(21) Appl. No.: 17/763,940

(22) PCT Filed: Sep. 23, 2020

(86) PCT No.: PCT/GB2020/052303
§ 371 (c)(1),
(2) Date: Mar. 25, 2022

(87) PCT Pub. No.: WO2021/058951
PCT Pub. Date: Apr. 1, 2021

(65) Prior Publication Data
US 2022/0362711 A1 Nov. 17, 2022

(30) Foreign Application Priority Data

Sep. 26, 2019 (GB) ..................................... 1913911

(51) Int. Cl.
*B01D 53/70* (2006.01)
*B01D 53/34* (2006.01)
(52) U.S. Cl.
CPC ........... *B01D 53/70* (2013.01); *B01D 53/346* (2013.01); *B01D 2251/11* (2013.01);
(Continued)

(58) Field of Classification Search
CPC ...... B01D 53/00; B01D 53/005; B01D 53/34; B01D 53/346; B01D 53/46; B01D 53/68;
(Continued)

(56) References Cited

U.S. PATENT DOCUMENTS 5,759,237 A    6/1998  Li et al.
6,602,323 B2 * 8/2003  Chae ....................... B01D 53/70
                                                        95/149
(Continued)

FOREIGN PATENT DOCUMENTS

GB    2373459 A      9/2002
JP    H09308817 A   12/1997
(Continued)

OTHER PUBLICATIONS

British Examination Report dated Mar. 19, 20 and Search Report dated Mar. 18, 20 for corresponding British Application No. GB1913911. 2, 5 pages.

(Continued)

*Primary Examiner* — Natasha E Young
(74) *Attorney, Agent, or Firm* — Theodore M. Magee; Westman, Champlin & Koehler, P.A.

(57) ABSTRACT

A method of optimising operating conditions in an abatement apparatus configured to treat an effluent stream from a processing tool and an abatement apparatus are disclosed. The method of optimising operating conditions in an abatement apparatus configured to treat an effluent stream containing PFC from a processing tool comprise: changing an operating parameter which controls an operating condition of the abatement apparatus; determining a change in a PFC concentration present in an exhaust stream of the abatement apparatus; and determining whether to retain the operating parameter based on the change in the PFC concentration. In this way, the concentration of PFC present in the exhaust can (Continued)

be used to determine whether the abatement apparatus is operating under the correct operating conditions or not.

20 Claims, 6 Drawing Sheets

(52) U.S. Cl.
CPC ................ *B01D 2251/208* (2013.01); *B01D 2257/2066* (2013.01); *B01D 2258/0216* (2013.01)

(58) Field of Classification Search
CPC .............. B01D 53/70; B01D 2251/00; B01D 2251/10; B01D 2251/11; B01D 2251/20; B01D 2251/208; B01D 2257/00; B01D 2257/20; B01D 2257/206; B01D 2257/2066; B01D 2258/00; B01D 2258/02; B01D 2258/0216; B01D 2259/00; B01D 2259/80; F23G 7/00; F23G 7/06; F23G 7/061; F23G 7/065; F23G 2209/00; F23G 2209/14; F23G 2209/142; Y02C 20/00; Y02C 20/30
See application file for complete search history.

(56) References Cited

U.S. PATENT DOCUMENTS

| | | | |
|---|---|---|---|
| 8,455,261 B2 * | 6/2013 | Baker | ................ G01N 33/0052 436/171 |
| 8,668,868 B2 | 3/2014 | Chiu et al. | |
| 2001/0009652 A1 | 7/2001 | Arno | |
| 2001/0012500 A1 | 8/2001 | Krodel et al. | |
| 2001/0015066 A1 | 8/2001 | Takaku et al. | |
| 2002/0134233 A1 | 9/2002 | Chae et al. | |
| 2006/0104878 A1 | 5/2006 | Chiu et al. | |
| 2007/0172399 A1 | 7/2007 | Clark et al. | |
| 2009/0018688 A1 | 1/2009 | Chandler et al. | |
| 2009/0110622 A1 | 4/2009 | Chiu et al. | |
| 2015/0357168 A1 * | 12/2015 | Dickinson | ......... H01J 37/32357 165/53 |

FOREIGN PATENT DOCUMENTS

| | | |
|---|---|---|
| JP | 2014126342 A | 7/2014 |
| KR | 101522277 B1 | 5/2015 |
| TW | 200946208 A | 11/2009 |
| WO | 0172377 A2 | 10/2001 |

OTHER PUBLICATIONS

International Search Report dated Dec. 2, 20 for corresponding PCT application Serial No. PCT/GB2020/052303, 6 pages.
International Written Opinion dated Dec. 2, 20 for corresponding PCT application Serial No. PCT/GB2020/052303, 6 pages.
English translation of Taiwanese Search Report dated Jan. 9, 2024 for corresponding Taiwanese Application No. TW109133482, 1 page.
Chinese Office Action dated May 23, 2025 and Search Report dated May 21, 2025 for corresponding Chinese application Serial No. 202080067277.x, 13 pages.

* cited by examiner

OPTIMISING OPERATING CONDITIONS IN AN ABATEMENT APPARATUS

CROSS-REFERENCE OF RELATED APPLICATION

This application is a Section 371 National Stage Application of International Application No. PCT/GB2020/052303, filed Sep. 23, 2020, and published as WO 2021/058951 A1 on Apr. 1, 2021, the content of which is hereby incorporated by reference in its entirety and which claims priority of British Application No. 1913911.2, filed Sep. 26, 2019.

FIELD

The field of the invention relates to a method of optimising operating conditions in an abatement apparatus configured to treat an effluent stream from a processing tool and an abatement apparatus.

BACKGROUND

Abatement apparatus are known and are typically used for treating an effluent gas stream from a manufacturing process tool used in, for example, the semiconductor or flat panel display manufacturing industry. During such manufacturing, residual perfluorinated compounds (PFCs) and other compounds exist in the effluent gas stream pumped from the process tool. PFCs are difficult to remove from the effluent gas and their release into the environment is undesirable because they are known to have relatively high greenhouse activity.

Known abatement apparatus such as radiant burners use combustion to remove the PFCs and other compounds from the effluent gas stream to meet a particular destruction rate efficiency (DRE). Typically, the effluent gas stream is a nitrogen stream containing PFCs and other compounds. A fuel gas and an oxidant gas are mixed with the effluent gas stream and that gas stream mixture is conveyed into a combustion chamber that is laterally surrounded by the exit surface of a foraminous gas burner. Fuel gas and air are simultaneously supplied to the foraminous burner to affect flameless combustion at the exit surface, with the amount of air passing through the foraminous burner being sufficient to consume not only the fuel gas supplied to the burner, but also all the combustibles in the gas stream mixture injected into the combustion chamber.

Although techniques exist for processing the effluent gas stream, they each have their own shortcomings. Accordingly, it is desired to provide an improved technique for processing an effluent gas stream.

The discussion above is merely provided for general background information and is not intended to be used as an aid in determining the scope of the claimed subject matter. The claimed subject matter is not limited to implementations that solve any or all disadvantages noted in the background.

SUMMARY

According to a first aspect, there is provided a method of optimising operating conditions in an abatement apparatus configured to treat an effluent stream containing PFC from a processing tool, the method comprising: changing an operating parameter which controls an operating condition of the abatement apparatus; determining a change in a PFC concentration in an exhaust stream of the abatement apparatus; and determining whether to retain the operating parameter based on the change in the PFC concentration.

The first aspect recognizes the thermal abatement of PFC gases requires a high temperature, typically >1500° C. to abate, for example, $CF_4$. Air is typically supplied to the abatement apparatus, either (in the case of a gas-fired combustor) to support combustion, or (in the case of an electrically powered abatement unit such as a plasma or other electrically-heated) as a reagent to assist abatement of the PFC gas. The abatement unit typically receives nitrogen from pump purge together with the gases to be abated, and nitrogen and oxygen from the air. At the temperature required for PFC abatement, NOx is thermally generated from nitrogen and oxygen. Increasing the temperature improves the PFC abatement, but also increases the amount of NOx generated, as shown in FIG. 1.

Accordingly, a method is provided. The method may optimize or adjust operating conditions within an abatement apparatus which treats an effluent stream from a processing tool. That effluent stream may contain a perfluoro compound. The method may comprise changing or adjusting an operating parameter to control an operating condition of the abatement apparatus. The method may comprise determining or identifying a change or modification in the concentration or amount of PFC within an exhaust stream exiting the abatement apparatus in response to the change in operating condition. The method may comprise determining or deciding whether or not to retain the operating parameter which has been adjusted based on the change to the concentration of PFC. In this way, the concentration of PFC present in the exhaust can be used to determine whether the abatement apparatus is operating under the correct operating conditions or not. This change in concentration can provide an indication of whether a target DRE is being achieved by the abatement apparatus with that operating parameter.

In one embodiment, the changing comprises adjusting the operating parameter from an initial operating parameter to an adjusted operating parameter.

In one embodiment, the determining the change comprises determining an initial PFC concentration present in the exhaust stream and a resultant PFC concentration present in the exhaust stream in response to the adjusted operating parameter.

In one embodiment, the operating condition comprises one of an operating temperature and oxidising/reducing environment of the abatement apparatus. Accordingly, the operating condition may comprise the operating temperature and/or the oxidizing/reducing environment within the abatement apparatus.

In one embodiment, when the resultant PFC concentration is below the initial PFC concentration, the determining comprises retaining the adjusted operating parameter. Accordingly, should the PFC concentration in the exhaust reduce (meaning that the DRE has increased) then the changed operating parameter may to continue to be applied to continue to operate the abatement apparatus under the changed operating conditions.

In one embodiment, when the resultant PFC concentration is below the initial PFC concentration, but above a threshold concentration, the determining comprises retaining the adjusted operating parameter. Accordingly, should the PFC concentration in the exhaust reduce, but still match or exceed the threshold target concentration (meaning that a required DRE has not been achieved) and so too much PFC is still being exhausted from the abatement apparatus then the changed operating parameter may to continue to be applied to continue to operate the abatement apparatus under the changed operating conditions.

In one embodiment, when the adjusted operating parameter increases the operating temperature and the resultant PFC concentration is below the initial PFC concentration, but the resultant PFC concentration is above the threshold concentration, the determining comprises retaining the adjusted operating parameter. Accordingly, should the change in operating parameter increase the temperature within the abatement apparatus while the PFC concentration in the exhaust reduces, but still matches or exceeds the threshold target concentration (meaning that a required DRE has not been achieved) and so too much PFC is still being exhausted from the abatement apparatus then the changed operating parameter may to continue to be applied to continue to operate the abatement apparatus at the increased operating temperature.

In one embodiment, when the adjusted operating parameter decreases the operating temperature and the resultant PFC concentration is above the initial PFC concentration, but the resultant PFC concentration is above the threshold concentration, the determining comprises one of rejecting the adjusted operating parameter and preventing further changing of the operating parameter to decrease the operating temperature.

In one embodiment, when the adjusted operating parameter increases the operating temperature, the resultant PFC concentration is above the threshold concentration and the resultant PFC concentration is less than the initial PFC concentration, the determining comprises retaining the adjusted operating parameter. Accordingly, should the change in operating parameter increase the temperature within the abatement apparatus and the PFC concentration in the exhaust matches or exceeds the threshold target concentration (meaning that a required DRE has not been achieved) and so too much PFC is still being exhausted from the abatement apparatus but that the concentration of PFC being exhausted from the abatement apparatus is reducing, then the changed operating parameter may to continue to be applied to continue to operate the abatement apparatus at the increased operating temperature.

In one embodiment, when the resultant PFC concentration is below the initial PFC concentration, but is below the threshold concentration, the determining comprises one of rejecting the adjusted operating parameter and preventing further changing of the operating parameter to increase the operating temperature. Accordingly, should the PFC concentration present in the exhaust reduce, but still fails to exceed or falls below the target threshold concentration (meaning that the DRE has been achieved or exceeded) then the change to the operating parameter may be reversed. Alternatively, the change to the operating parameter may be kept, but further changes to that operating parameter to increase the operating temperature of the abatement apparatus may be prevented or rejected.

In one embodiment, when the adjusted operating parameter increases the operating temperature and the resultant PFC concentration is below the initial PFC concentration, but is below the threshold concentration, the determining comprises one of rejecting the adjusted operating parameter and preventing further changing of the operating parameter to increase the operating temperature. Accordingly, should the change in operating parameter increase the operating temperature and should the PFC concentration present in the exhaust reduce, but still fails to exceed or falls below the target threshold concentration (meaning that the DRE has been achieved or exceeded) then the change to the operating parameter may be reversed to reduce the operating temperature. Alternatively, the change to the operating parameter may be kept, but further changes to that operating parameter to increase the operating temperature of the abatement apparatus may be prevented or rejected.

In one embodiment, when the adjusted operating parameter decreases the operating temperature and the resultant PFC concentration is above the initial PFC concentration, but is below the threshold concentration, the determining comprises retaining the adjusted operating parameter.

In one embodiment, when the adjusted operating parameter increases the operating temperature, the resultant PFC concentration is below the threshold concentration and the resultant PFC concentration is less than the initial PFC concentration, the determining comprises one of rejecting the adjusted operating parameter and preventing further changing of the operating parameter to increase the operating temperature. Accordingly, should the change in operating parameter cause the concentration of PFC present in the exhaust to reduce and should the change in operating parameter increase the operating temperature and should the PFC concentration present in the exhaust fail to exceed or fall below the target threshold amount (meaning that the DRE has been achieved or exceeded) then the change to the operating parameter may be reversed to reduce the operating temperature. Alternatively, the change to the operating parameter may be kept, but further changes to that operating parameter to increase the operating temperature of the abatement apparatus may be prevented or rejected.

In one embodiment, the rejecting comprises changing the operating parameter back to the initial operating parameter. Accordingly, the operating parameter may be restored back to a preceding value.

In one embodiment, the rejecting comprises changing the operating parameter to a value between the initial operating parameter and the adjusted operating parameter.

In one embodiment, when the resultant PFC concentration is above the initial PFC concentration, the determining comprises one of rejecting the adjusted operating parameter and preventing further changing of the operating parameter. Accordingly, should the PFC concentration in the exhaust increase (meaning that the DRE has decreased) then the changed operating parameter may be reversed. Alternatively, the change to the operating parameter may be kept, but further changes to that operating parameter may be prevented or rejected.

In one embodiment, the abatement apparatus comprises an abatement chamber and the operating parameter comprises at least one of a power supplied to heat the abatement chamber, a plasma supplied to the abatement chamber and an oxidant/fuel amount supplied to the abatement chamber. Accordingly, the power supplied to heat the abatement chamber and/or the plasma supplied to the abatement chamber and/or the oxidant/fuel mix amounts supplied to the abatement chamber may be adjusted. For example, changing the amount of power supplied to an electrically-powered abatement apparatus will change the operating temperature of that abatement apparatus. Likewise, changing the amount of plasma supplied to an abatement apparatus will change the operating temperature of that abatement apparatus and possibly the oxidizing/reducing conditions within that abatement apparatus. Likewise, changing the amount of a particular oxidant/fuel mix and/or varying the amount of oxidant to fuel within the mix can vary the operating temperature as well as the oxidizing/reduction environment within the abatement apparatus.

In one embodiment, when the operating parameter comprises the oxidant/fuel amount, the changing comprises increasing the oxidant/fuel amount and the resultant PFC concentration is above the initial PFC concentration, the determining comprises reducing the oxidant/fuel amount while the resultant PFC concentration passes through a minimum value.

In one embodiment, when the operating parameter comprises the oxidant/fuel amount, the changing comprises increasing the oxidant/fuel amount, the resultant PFC concentration is above the initial PFC concentration, but the resultant PFC concentration is below the threshold concentration, the determining comprises reducing the oxidant/fuel amount while the resultant PFC concentration passes through a minimum value. This embodiment recognizes that in a fuel fired abatement apparatus using, for example, an inward-fired combustor, fuel and oxygen are injected with the gas stream to be abated, in order to generate more intense combustion and thus achieve the temperature required to abate the PFC gas. The fuel may be methane or propane, or other gaseous hydrocarbons. For a particular flow of fuel gas injected, as the flow of oxygen injected is increased, the combustion efficiency and thus the operating temperature changes. At low oxygen flow, there is insufficient oxygen for complete combustion, temperature is low, NOx generation is low, PFC abatement is poor, and high levels of CO are emitted from partially-combusted fuel. As the oxygen flow approaches the stoichiometric ratio with the fuel (for optimum combustion efficiency), temperature increases, NOx generation increases, PFC abatement improves, and CO reduces. Further increases in oxygen flow at first reduces the CO emissions, as the excess oxygen ensures complete combustion of the fuel, with little effect on PFC abatement; but then begins to dilute the combustion mixture, leading to a reduction in temperature and reduced PFC abatement, as illustrated in FIG. 3. Accordingly, should the oxidant/fuel mix be increased to increase the operating temperature and the PFC present in the exhaust is at or fails to exceed the target threshold concentration (meaning that the DRE has been achieved or exceeded), then the oxidant/fuel mix may be reduced or decreased for the period that such reducing causes the PFC present in the exhaust to achieve a minimum value and start increasing in order to avoid excess oxygen diluting the combustion mixture which caused a reduction in operating temperature and an unnecessary increase in the PFC present in the exhaust (and associated unnecessary reduction in the DRE).

In one embodiment, when the operating parameter comprises the oxidant/fuel amount, the changing comprises decreasing the oxidant/fuel amount and the resultant PFC concentration is below the initial PFC concentration, the determining comprises reducing the oxidant/fuel amount while the resultant PFC concentration passes through a minimum value.

In one embodiment, when the operating parameter comprises the oxidant/fuel amount, the changing comprises decreasing the oxidant/fuel amount, the resultant PFC concentration is below the threshold concentration and the resultant PFC concentration is less than the initial PFC concentration, the determining comprises reducing the oxidant/fuel amount while the resultant PFC concentration passes through a minimum value. Accordingly, should the changes to the oxidant/fuel mix cause the PFC present in the exhaust to decrease and the PFC present in the exhaust is at or fails to exceed the target threshold concentration (meaning that the DRE has been achieved or exceeded), then the oxidant/fuel mix may be reduced or decreased for the period that such reducing causes the PFC present in the exhaust to achieve a minimum value and start increasing in order to avoid excess oxygen diluting the combustion mixture which caused a reduction in operating temperature and an unnecessary increase in the PFC present in the exhaust (and associated unnecessary reduction in the DRE).

In one embodiment, the rejecting comprises changing the operating parameter back to the initial operating parameter.

In one embodiment, the rejecting comprises changing the operating parameter to a value between the initial operating parameter and the adjusted operating parameter.

In one embodiment, when the operating parameter comprises the oxidant/fuel amount and the abatement apparatus is supplied by an enriched air source augmented by at least one of an oxygen and nitrogen source, the changing comprises adjusting at least one of the oxygen and nitrogen source to adjust the oxidant/fuel amount. Accordingly, an enriched air source may be provided (which typically provides air with higher than concentrations of oxygen than ambient air in a more cost-effective manner than providing the same amount of oxygen from a pure oxygen source) and the amount of oxygen present may be topped up using an oxygen source and/or diluted using a nitrogen source to arrive at the desired oxidant/fuel mix amount.

In one embodiment, the method comprises iteratively repeating the steps of changing and determining. Accordingly, the step of adjusting the operating parameter and identifying the amount of PFC present in the source may be repeated with the previous changes in the operating parameter being the starting point for further changes in that operating parameter.

In one embodiment, the determining comprises determining the initial PFC concentration in response to an indication being received which indicates that PFC is present in the effluent stream. Accordingly, a signal may be provided from, for example, the processing tool or from a sensor detecting the presence or likely presence of a PFC.

In one embodiment, the method comprises identifying a PFC concentration profile of a processing cycle prior to the changing. Accordingly, the typically-varying concentration of PFC present in the effluent stream during a processing cycle may first be determined in order to understand whether it is appropriate to adjust the operating parameters within each processing cycle (should the processing cycle be relatively long and the amount of PFC present in the exhaust relatively constant) or whether it would be more appropriate to vary the operating parameters between processing cycles.

In one embodiment, the method comprises, when the PFC concentration profile deviates by greater than a maximum deviation amount, the changing occurs in subsequent processing cycles.

In one embodiment, the method comprises, when the PFC concentration profile deviates by greater than the maximum deviation amount, selecting a time within each processing cycle to determine the change in the PFC concentration present in the exhaust stream.

According to a second aspect, there is provided an abatement apparatus configured to treat an effluent stream containing PFC from a processing tool, comprising: a controller operable to change an operating parameter which controls an operating condition of the abatement apparatus; a sensor operable to determine a change in a PFC concentration present in an exhaust stream of the abatement apparatus, wherein the controller is operable to determine whether to retain the operating parameter based on the change in the PFC concentration present in the exhaust stream determined by the sensor.

In one embodiment, the controller is operable to adjust the operating parameter from an initial operating parameter to an adjusted operating parameter.

In one embodiment, the controller is operable to determine an initial PFC concentration present in the exhaust stream and a resultant PFC concentration present in the exhaust stream in response to the adjusted operating parameter.

In one embodiment, the operating condition comprises one of an operating temperature and oxidising/reducing environment of the abatement apparatus.

In one embodiment, the controller is operable, when the resultant PFC concentration is below the initial PFC concentration, to retain the adjusted operating parameter.

In one embodiment, the controller is operable, when the resultant PFC concentration is below the initial 8 PFC concentration, but above a threshold concentration, to retain the adjusted operating parameter.

In one embodiment, the controller is operable, when the adjusted operating parameter increases the operating temperature and the resultant PFC concentration is below the initial PFC concentration, but the resultant PFC concentration is above the threshold concentration, to retain the adjusted operating parameter.

In one embodiment, the controller is operable, when the adjusted operating parameter decreases the operating temperature and the resultant PFC concentration is above the initial PFC concentration, but the resultant PFC concentration is above the threshold concentration, to perform one of reject the adjusted operating parameter and prevent further changing of the operating parameter to decrease the operating temperature.

In one embodiment, the controller is operable, when the adjusted operating parameter increases the operating temperature, the resultant PFC concentration is above the threshold concentration and the resultant PFC concentration is less than the initial PFC concentration, to retain the adjusted operating parameter.

In one embodiment, the controller is operable, when the resultant PFC concentration is below the initial PFC concentration, but is below the threshold concentration, to perform one of reject the adjusted operating parameter and prevent further changing of the operating parameter to increase the operating temperature.

In one embodiment, the controller is operable, when the adjusted operating parameter increases the operating temperature and the resultant PFC concentration is below the initial PFC concentration, but is below the threshold concentration, to perform one of reject the adjusted operating parameter and prevent further changing of the operating parameter to increase the operating temperature.

In one embodiment, the controller is operable, when the adjusted operating parameter decreases the operating temperature and the resultant PFC concentration is above the initial PFC concentration, but is below the threshold concentration, to retain the adjusted operating parameter.

In one embodiment, the controller is operable, when the adjusted operating parameter increases the operating temperature, the resultant PFC concentration is below the threshold concentration and the resultant PFC concentration is less than the initial PFC concentration, to perform one of reject the adjusted operating parameter and prevent further changing of the operating parameter to increase the operating temperature.

In one embodiment, the controller is operable to reject by changing the operating parameter back to the initial operating parameter.

In one embodiment, the controller is operable to reject by changing the operating parameter to a value between the initial operating parameter and the adjusted operating parameter.

In one embodiment, the controller is operable, when the resultant PFC concentration is above the initial PFC concentration, to perform one of rejecting the adjusted operating parameter and preventing further changing of the operating parameter.

In one embodiment, the abatement apparatus comprises an abatement chamber and the operating parameter comprises at least one of a power supplied to heat the abatement chamber, a plasma supplied to the abatement chamber and an oxidant/fuel amount supplied to the abatement chamber.

In one embodiment, the controller is operable, when the operating parameter comprises the oxidant/fuel amount, the changing comprises increasing the oxidant/fuel amount and the resultant PFC concentration is above the initial PFC concentration, to reducing the oxidant/fuel amount while the resultant PFC concentration passes through a minimum value.

In one embodiment, the controller is operable, when the operating parameter comprises the oxidant/fuel amount, the change comprises increasing the oxidant/fuel amount, the resultant PFC concentration is above the initial PFC concentration, but the resultant PFC concentration is below the threshold concentration, to reduce the oxidant/fuel amount while the resultant PFC concentration passes through a minimum value.

In one embodiment, the controller is operable, when the operating parameter comprises the oxidant/fuel amount, the changing comprises decreasing the oxidant/fuel amount and the resultant PFC concentration is below the initial PFC concentration, to reduce the oxidant/fuel amount while the resultant PFC concentration passes through a minimum value.

In one embodiment, the controller is operable, when the operating parameter comprises the oxidant/fuel amount, the change comprises decreasing the oxidant/fuel amount, the resultant PFC concentration is below the threshold concentration and the resultant PFC concentration is less than the initial PFC concentration, to reduce the oxidant/fuel amount while the resultant PFC amount passes through a minimum value.

In one embodiment, the controller is operable to reject by changing the operating parameter back to the initial operating parameter.

In one embodiment, the controller is operable to reject by changing the operating parameter to a value between the initial operating parameter and the adjusted operating parameter.

In one embodiment, the controller is operable, when the operating parameter comprises the oxidant/fuel amount and the abatement apparatus is supplied by an enriched air source augmented by at least one of an oxygen and nitrogen source, to adjust at least one of the oxygen and nitrogen source to adjust the oxidant/fuel amount.

In one embodiment, the controller is operable to iteratively repeat changing the operating parameter and determining whether to retain the operating parameter.

In one embodiment, the sensor is operable to determine the initial PFC concentration in response to an indication being received which indicates that PFC is present in the effluent stream.

In one embodiment, the controller is operable to identify a PFC concentration profile of a processing cycle prior to changing the operating parameter.

In one embodiment, the controller is operable, when the PFC concentration profile deviates by greater than a maximum deviation amount, to make the changes to the operating parameter in subsequent processing cycles.

In one embodiment, the controller is operable, when the PFC concentration profile deviates by greater than the maximum deviation amount, to select a time within each processing cycle to determine the change in the PFC amount concentration in the exhaust stream.

According to a third aspect, there is provided a computer program product operable, when executed by a computer to control an abatement apparatus to perform the method of the first aspect and its embodiments.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

The Summary is provided to introduce a selection of concepts in a simplified form that are further described in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the present invention will now be described further, with reference to the accompanying drawings, in which.

DETAILED DESCRIPTION

Before discussing the embodiments in any more detail, first an overview will be provided. Embodiments provide an arrangement which controls the operating conditions within the abatement apparatus to reduce the presence of PFCs in the exhaust stream while controlling the production of unwanted by-products generated within the abatement apparatus and/or controlling the resources consumed by the abatement apparatus. For example, the operating temperature and/or the oxidizing/reducing environment within the abatement apparatus may be controlled to achieve a target operating condition, that target operating condition having been selected as a known suitable trade-off condition which achieves a required target for PFC abatement while also controlling the amount of a reaction by-product produced and/or control the resources consumed by the abatement apparatus. For example, emissions regulations may require a specific minimum DRE of PFC gases, such as DRE>95% for $CF_4$. The regulations may also prescribe limits for emissions of combustion by-products such as NOx.

Abatement Apparatus

Figure 2:
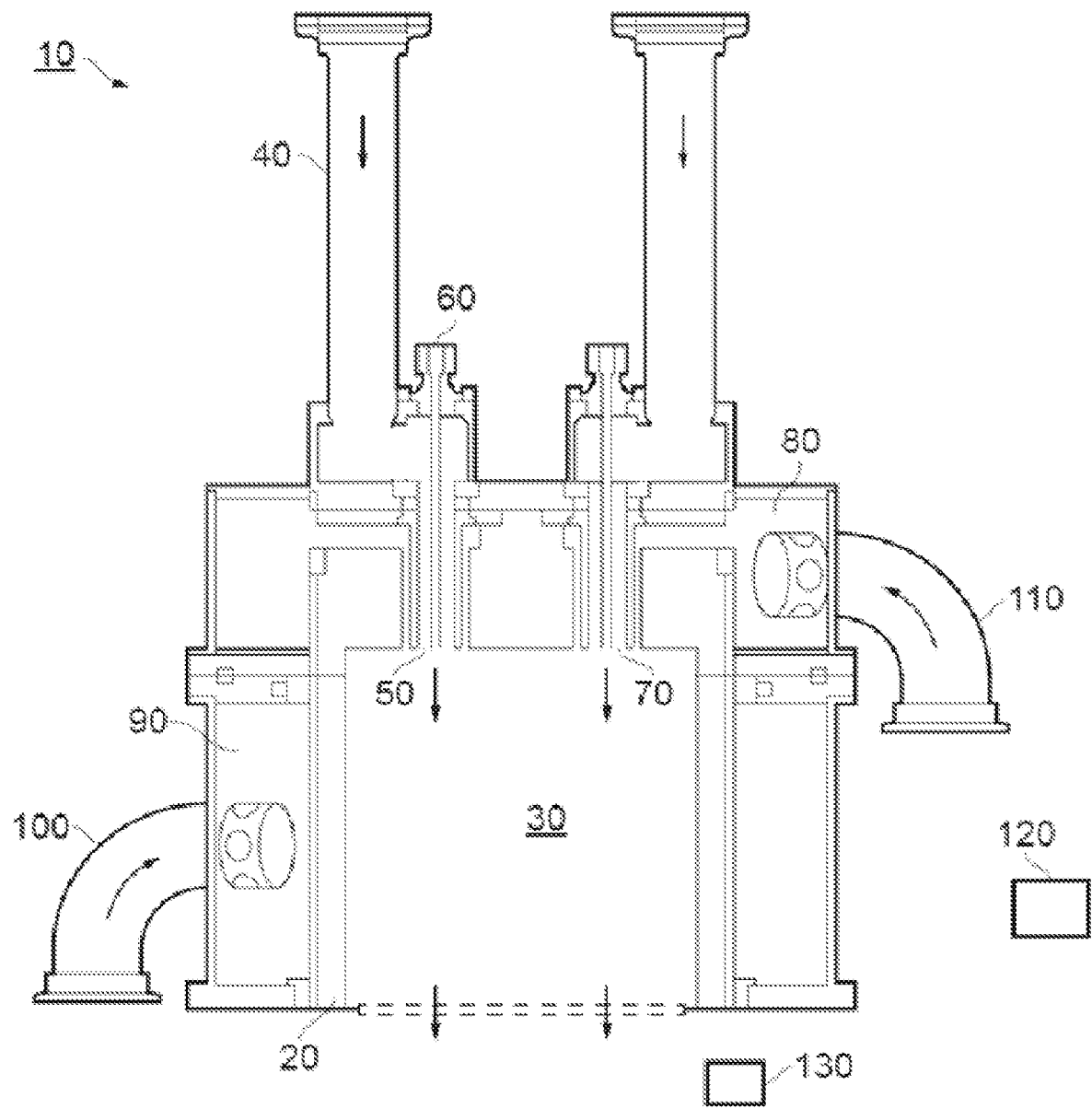
FIG. 2 illustrates an inwardly fired combustion abatement apparatus according to one embodiment.

FIG. 2 shows an inwardly fired combustion abatement apparatus 10 according to one embodiment. The abatement apparatus 10 comprises an inwardly fired foraminous burner 20 which is supplied with a hydrocarbon fuel (typically methane or propane)/air mixture that provides a hot zone and ignition source for chemical destruction of target compounds within an effluent stream which is introduced into a combustion chamber 30 at the core of the burner by means of inlet pipework 40 ending at a nozzle 50. Typically, fuel is supplied to a plenum 90 from a fuel inlet 100 to supply the foraminous burner 20 under the control of a controller 120.

The nozzles 50 are provided with ancillary ports located as a central lance 60 or coaxial annulus 70 (supplied from a shared plenum 80) which are used for the introduction of fuel gases or oxidants supplied under the control of the controller 120 in order to aid the destruction of these compounds to be treated. Typically, an oxidant/fuel mixture is supplied via the central lance 60 and an oxidant/fuel inlet 110 to the plenum 90 to supply the coaxial annulus 70 under the control of the controller 120.

A sensor 130 is provided which measures the concentration of PFCs in the exhaust from the combustion chamber 30. The PFC concentration in the abatement exhaust can be measured by infra-red absorption at a characteristic frequency for the PFC gas of interest. Fourier Transform infrared (FTIR) spectrometers and mass spectrometers are known and can be used, but are expensive and can be damaged by prolonged exposure to the acids and powders in the exhaust stream. A low-cost nondispersive infrared (NDIR) sensor can be used but may be cross-sensitive to other gases due to broader frequency response. A photoacoustic IR sensor may be more suitable due to its narrow frequency response, high sensitivity, and resistance to corrosion.

A water weir and quench section (not shown) is provided downstream from the combustion chamber 30 for the cooling of the exhaust, as well as a packed tower (not shown) for the absorption of water-soluble gases.

Example Operation

Operating Characteristics Determination

Figure 1:
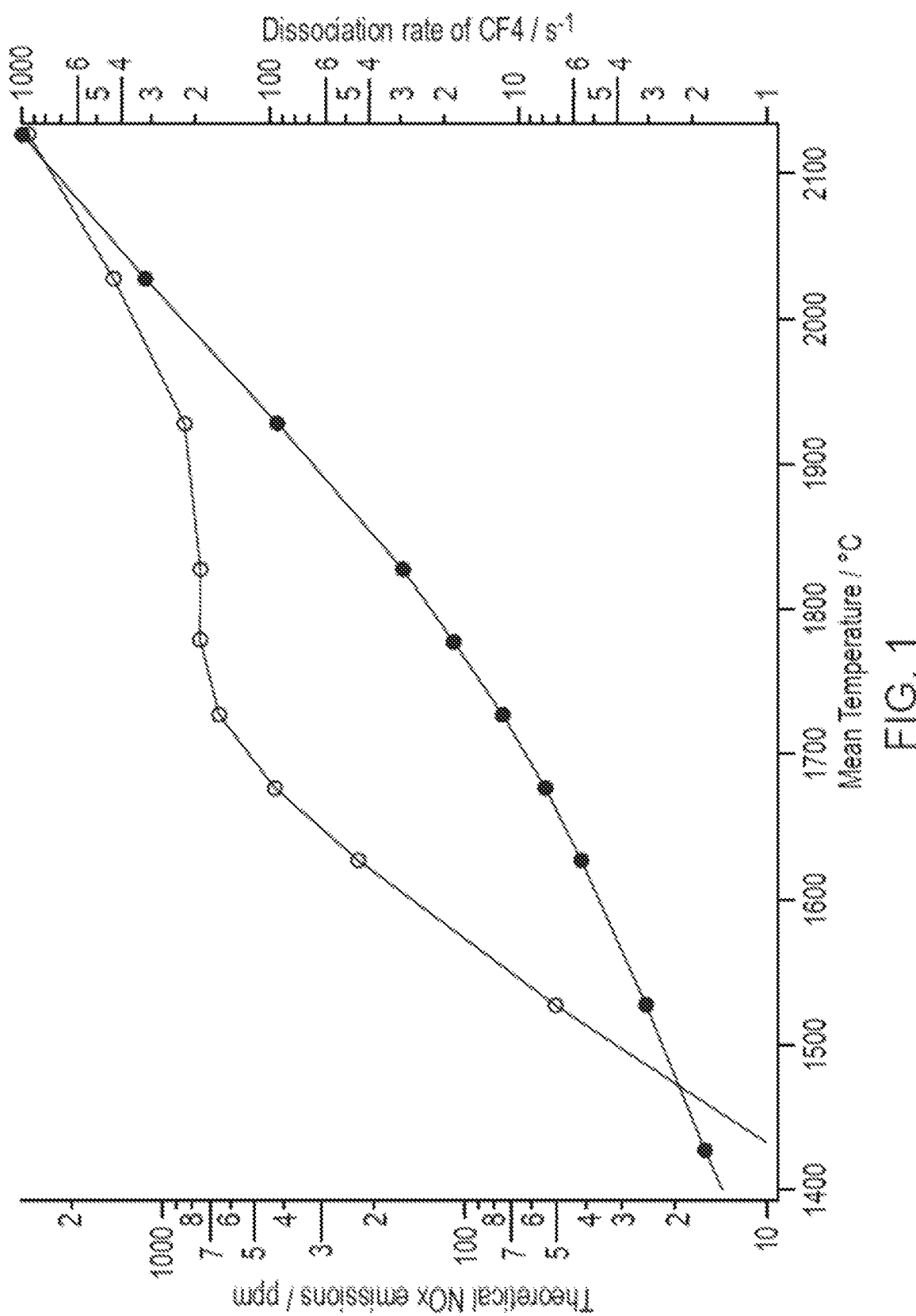
FIG. 1 is a graph illustrating NOx generation and $CF_4$ destruction versus temperature.
Figure 3:
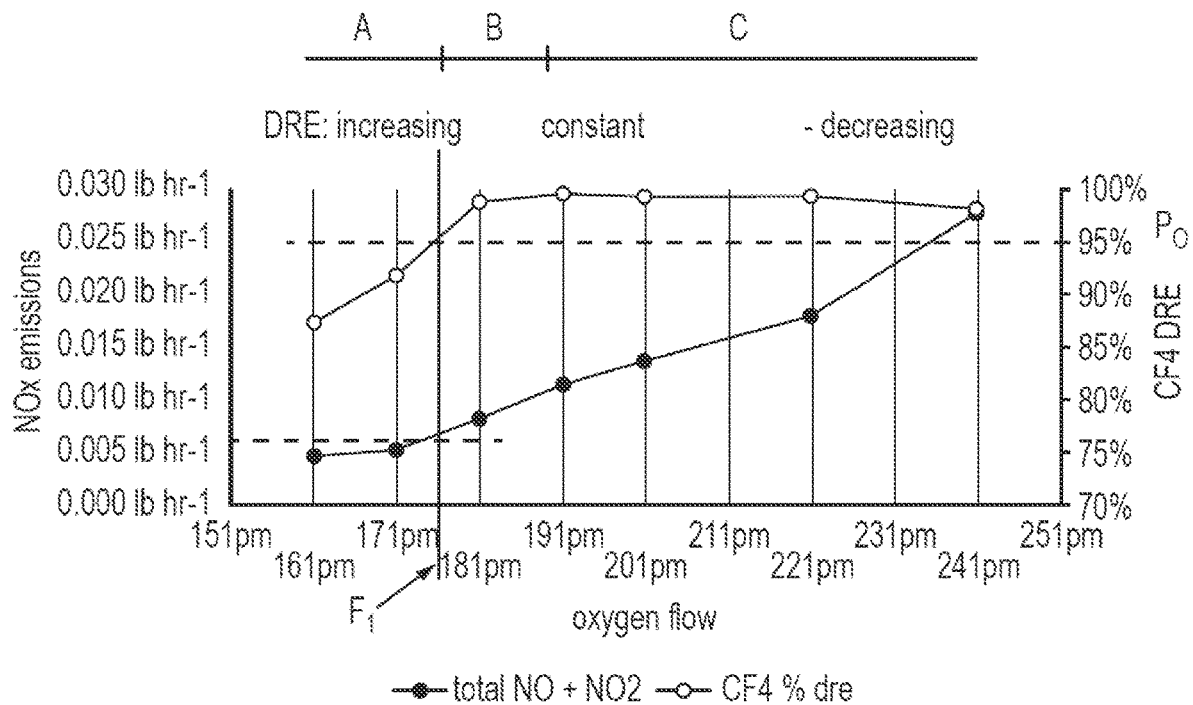
FIG. 3 is a graph illustrating NOx generation and $CF_4$ destruction versus oxygen inject flow.

Although not necessary in every embodiment, in order to improve the performance of the abatement apparatus 10, the relationship between operating temperature, PFC DRE and NOx generation is determined initially. In particular, by measuring the change of PFC concentration in the abatement exhaust in response to a change in the injected oxygen, the operating region on the graph describing the relationship between the oxygen flow and the resultant NOx generation and PFC DRE can be determined and the oxygen inject flow can be optimized, as illustrated in FIG. 3. This relationship can then be used to set the initial operating conditions (in this example, the initial oxygen flow rate) selected by the controller 120 and set how the controller 120 should respond to changes in PFC amounts present in the exhaust as the operating conditions are changed. As mentioned above, having a detailed understanding of this relationship is not necessary as the controller 120 can alternatively implement a simpler relationship which assumes that increasing operating temperature should decrease PFC amounts and increase NOx amounts, and vice-versa such as illustrated in FIG. 1.

Controller Operation

The main steps performed by the controller 120 will now be described. The controller 120 operates to control the operating conditions within the combustion chamber 30, in this example by controlling the operating temperature within the combustion chamber 30, so that by regulating the flow of oxygen (or fuel) injected to just achieve the required PFC DRE level, the formation and emission of NOx can be minimized.

The main considerations for the controller in response to the PFC measured by the sensor 130 are as follows. If the DRE increases (meaning that the concentration of PFC in the exhaust decreases) in response to an increase in oxygen flow and the DRE is less than or equal to a required level, then the amount of oxygen flow should be increased until the DRE increases (meaning that the amount of PFC decreases) to the required level since the abatement apparatus 10 is currently operating in the region A shown on FIG. 3 such that it is over-exhausting PFC and under-producing NOx.

If the DRE increases (meaning that the amount of PFC decreases) in response to an increase in the oxygen flow supplied and the DRE is greater than or equal to the required level, then the oxygen flow supplied should be reduced until the DRE reduces (meaning that the PFC amount increases) to the required level since the abatement apparatus is operating in the region B shown on FIG. 3 such that it is under-exhausting PFC and overproducing NOx If the DRE reduces (meaning that the PFC amount increases) in response to an increase in the oxygen flow supplied, then the oxygen flow supply should be reduced so that the DRE passes through a peak value (the PFC amount passes through a minimum value—because the DRE passes through a maximum there may be two points where a 95% DRE is achieved and the point having the lowest utilisation of oxygen is the one which generates the least NOx) and then the DRE reduces to the required level (the PFC concentration increases to the required level) since the abatement apparatus 10 is operating in region C shown in FIG. 3 and the oversupply of the oxygen causes the operating temperature of the abatement apparatus to drop, resulting in a reducing DRE (increasing amount of PFC) and an over-generation of NOx.

It will be appreciated that embodiments envisage other types of abatement apparatus such as electrically-heated or plasma-supplied abatement apparatus. Those embodiments will typically exhibit similar characteristics to those illustrated in FIG. 3, particularly in relations to regions A and B.

Figure 5:
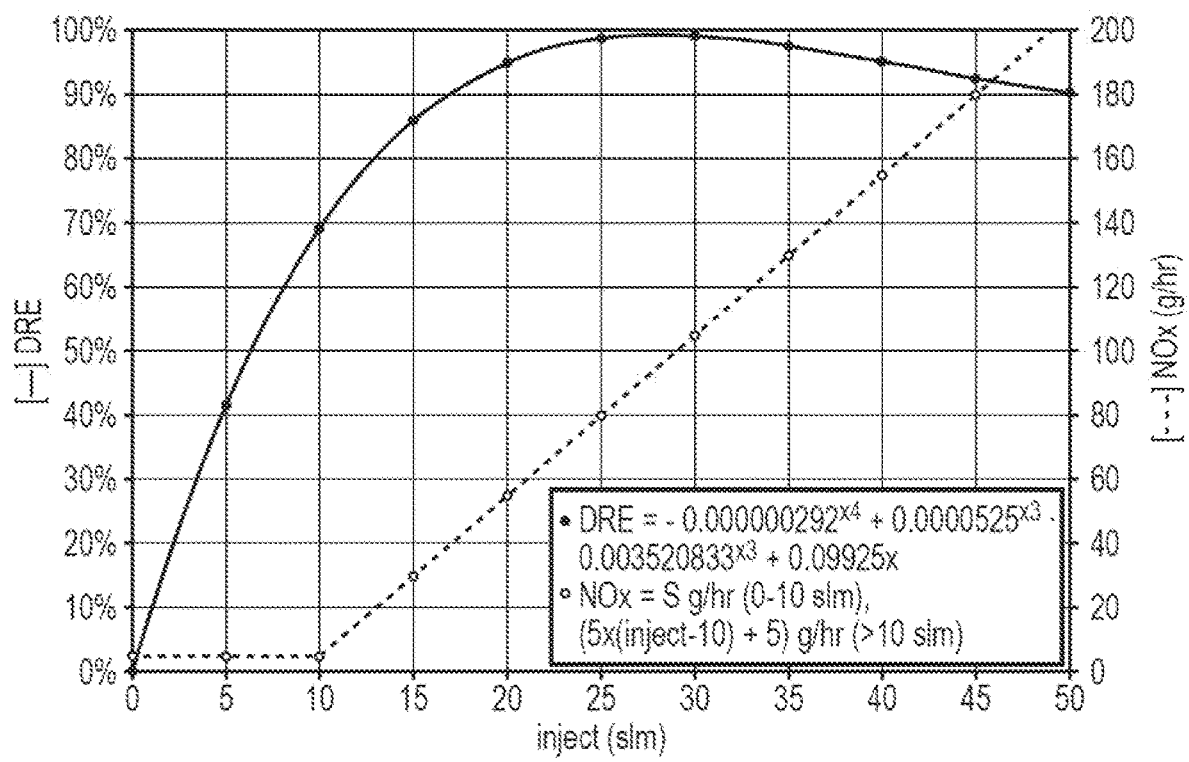
FIG. 5 shows typical DRE and NOx emissions as a function of injected $O_2$ from a single nozzle abatement apparatus.

FIG. 5 is a plot of DRE and NOx emissions as a function of premixed oxygen inject flow to the inlet from an abatement apparatus in one embodiment. In this embodiment the DRE reaches a maximum between 20 and 25 SLM of $O_2$. Note that the curve passes through 95% DRE at two points—20 SLM and 40 SLM. The NOx emissions rise linearly after an initial plateau. Typically, 95% DRE is required to meet environmental standards, any improvement on this leads to increased NOx emission and is wasteful of resources. Therefore, it is desired to use the lowest oxygen flow which achieves this standard.

Figure 6:
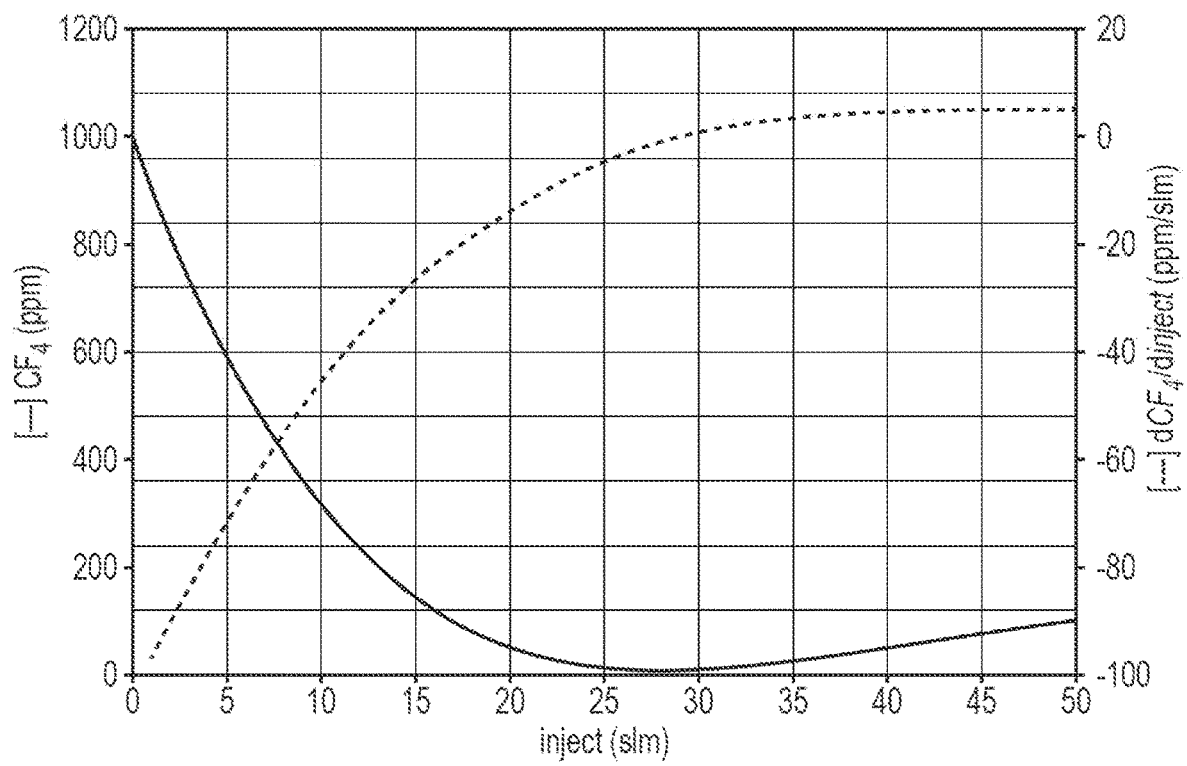
FIG. 6 shows the concentration of $CF_4$ in the exhaust from the data in FIG. 1 as a function of inject $O_2$ flow (solid line), the auxiliary y-axis shows the rate of change of $CF_4$ concentration with inject $O_2$ flow (dashed line)

FIG. 6 (left plot) shows the calculated residual $CF_4$ in the exhaust arising from the DRE performance curve shown in FIG. 5 assuming a $CF_4$ flow of 1 SLM and a dilution factor of 1000 (these conditions will be employed in the rest of this discussion to illustrate various examples). Also shown is the rate of change of steady-state $CF_4$ concentration with the rate of change of $O_2$ inject (right plot). Above the minimum in $CF_4$ (i.e. at maximum DRE) the abatement gets worse as the $O_2$ inject is increased. This feature can be used to establish the optimum of the two possible solutions to achieving (for example) 95% DRE.

Controller Processing Steps

Figure 4:
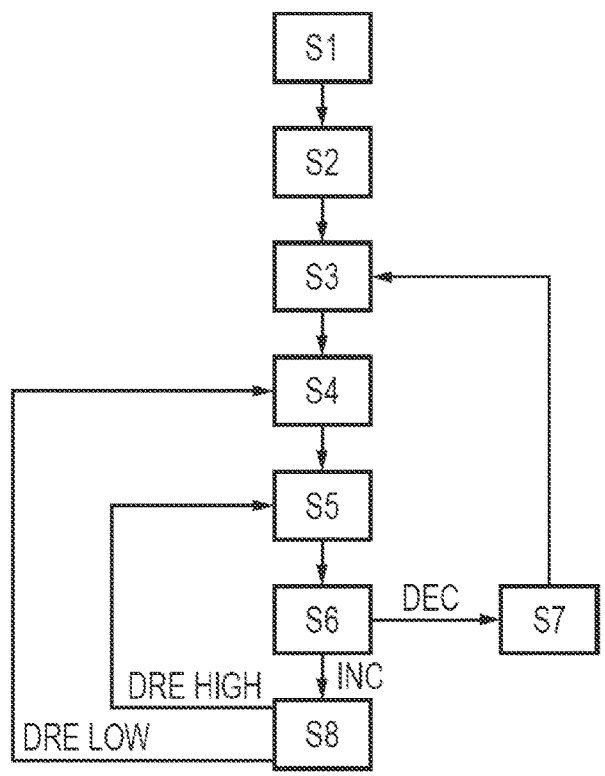
FIG. 4 is a flowchart showing the main processing steps performed by a controller according to one embodiment.

FIG. 4 is a flowchart illustrating in more detail the main steps performed by the controller 120 in one example implementation described with reference to FIG. 3. In this implementation, the target concentration in the exhaust is $P_O$ (which can be set based on achieving a DRE of, for example, 95%). At that target concentration, it is expected that the NOx generation will be around 0.0065 lbs/hr.

At step S1, the PFC gas enters the effluent stream, which may be signalled to the controller 120 from the processing tool, detected by a mass flow controller (not shown) at the inlets to the abatement apparatus 10 or may be detected by the sensor 130. Processing then proceeds to step S2.

At step S2, the oxygen inject inlet flow is set to a flow rate of $F_1$ standard litres per minute (SLM) as an initial flow rate setting expected to achieve the required DRE. For example, the flow rate $F_1$ may be set to 17.6 SLM, as shown in FIG. 3. Processing then proceeds to step S3.

At step S3, the sensor 130 measures the initial PFC concentration $P_1$ in the exhaust. Processing then proceeds to step S4.

At step S4, the oxygen inject flow is increased by ΔF to $F_N$ SLM. Typically, the flow is increased by, for example, 5%. Processing then proceeds to step S5.

At step S5, the resultant PFC concentration $P_N$ is measured using the sensor 130. Processing then proceeds to step S6.

At step S6, it is determined whether the DRE has increased (meaning is $P_N$ less than $P_1$). If the DRE has not increased, then processing proceeds to step S7. If the DRE has increased, then processing proceeds to step S8.

At step S7, it is determined that the oxygen flow is too high and the abatement apparatus is operating in region C shown in FIG. 3. Accordingly, the oxygen inject flow is reduced by a percentage amount (for example, 33%) and processing returns to step S3.

At step S8, if the resultant concentration $P_N$ is greater than the target concentration $P_O$ then the abatement apparatus is operating in region A shown in FIG. 3, meaning that the DRE is too low, and so processing returns to step S4. If the resultant concentration $P_N$ is less than the target concentration $P_O$ then this means that the abatement apparatus is operating in the region B shown in FIG. 3, meaning that the DRE is too high, and so the oxygen inject flow is reduced by ΔF and processing returns to step S5. If the resultant concentration matches the target concentration, meaning that the DRE has been achieved, then no further changes to the oxygen inject flow are required at this time.

Should it be desirable to re-evaluate whether the abatement apparatus 10 is operating optimally at a future point, then processing can return to step S3 and repeated.

In an alternative approach for the characteristics show in FIGS. 5 and 6, the search strategy is thus:

(1) Establish the desired $CF_4$ concentration in the exhaust using supplied parameters: DRE required, $CF_4$ input into the abatement and dilution factor of the apparatus and pump purge.

(2) Measure the $CF_4$ concentration in exhaust at starting inject.

(3) Increase the inject flow by a step size and remeasure $CF_4$ concentration, if this is at or below target and the $CF_4$ concentration reduces with increasing $O_2$ inject, then accept new conditions and repeat.

(4) If the new concentration is less than target, then decrease inject flow until it is above target, decrease the step size in (3) and repeat (3).

(5) If the new concentration is greater than target and the $CF_4$ concentration is increasing with increasing inject flow, then decrease inject, repeat (5) until the $CF_4$ concentration is less than the target then do (4) until such time as it is above target and go to (3).

(6) Keep going until when (3) is executed the target is reached or the step size reaches a lower limit (this accommodates situations where the desired DRE cannot be reached and settles at the best solution that can be found).

(7) Once a solution has been found the optimum historic value is used as a starting point for the starting inject, thus allowing the solution to be found faster in future searches.

A BASIC computer program to perform this search using model data as a proxy for measurements of $CF_4$ in the exhaust (i.e. curve fit to the DRE performance in FIG. 5) is listed in the Appendix.

Figure 7:
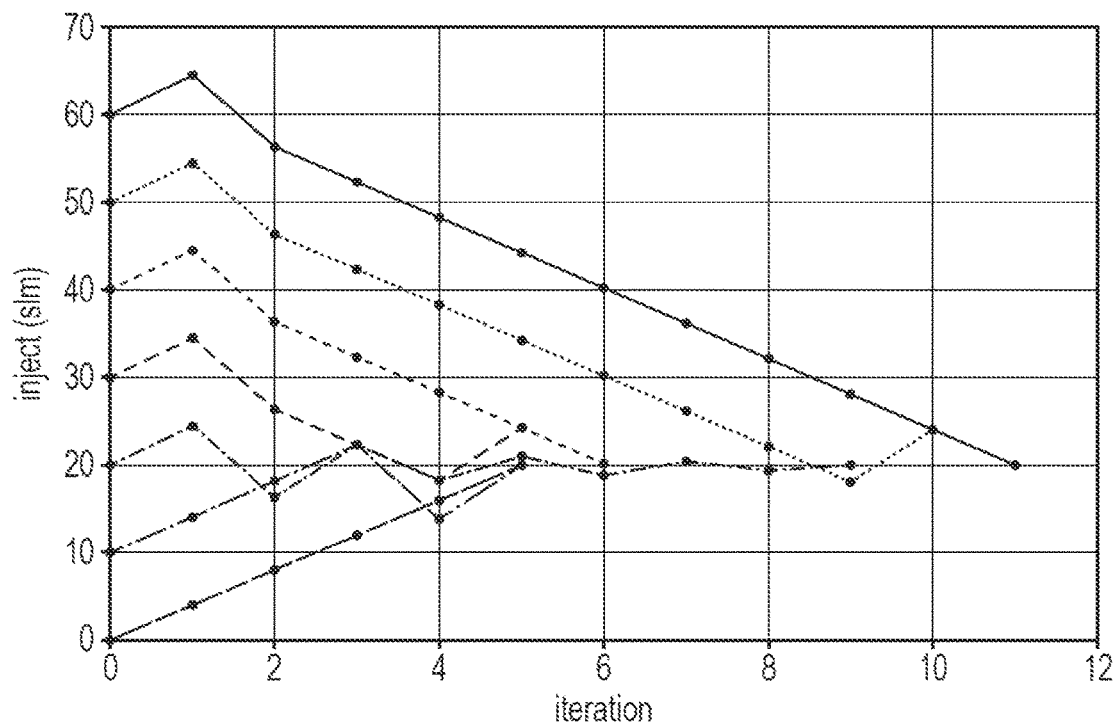
FIG. 7 is a plot showing $O_2$ inject flow vs number of iterations of a computer algorithm to find a solution for optimum inject flow at 95% DRE for 1 SLM of $CF_4$ at a dilution factor of 1000 with pure $O_2$ with different starting points.

An example of a search for optimum inject flow starting from different initial conditions is shown in FIG. 7. This demonstrates that the algorithm is robust even at extreme starting points and manages to find the desired solution which combines a target DRE of 95% and lowest possible NOx.

Processing Cycle Optimisation

It is unlikely that there will be a constant flow of PFC gas to the abatement apparatus 10. In practice, the PFC flow will be intermittent, corresponding to one or more processing steps for each wafer. The PFC gas flow to the abatement apparatus 10 may also vary within the processing step, for example being produced by consumption of the gas in etching a layer of material onto a wafer, then increasing once the layer has been etched (known as over-etch). Accordingly, embodiments account for this variation by learning an optimum inject flow over a sequence of wafers subjected to the same process. When it is detected that the PFC gas is present, then the sensor 130 can be monitored during this period and a profile showing the amount of PFC generated with time can be determined for evaluation. If the PFC amount is relatively constant then the processing steps can be performed within each processing period—in other words intra-processing period optimisation will typically occur. However, if the PFC amount varies greater than a particular amount, then an average PFC amount may be calculated for each processing step and the processing steps outlined above may be performed at a time when the PFC amounts most closely match that averaged amount—in other words inter-processing period optimisation will typically occur.

A method to account for this variation in flow is to "learn" the optimum inject flow over a sequence of wafers subjected to the same process. If a digital signal is available to indicate when the PFC gas is flowing, the sensor 130 reading can be monitored during this period, and an average value calculated. The oxygen inject flow is increased for the next wafer process, and the sensor 130 reading averaged for this next wafer. Then the same method previously described followed to determine whether the inject flow should be further increased or decreased for each subsequent wafer, until an optimum setting is achieved.

Figure 8:
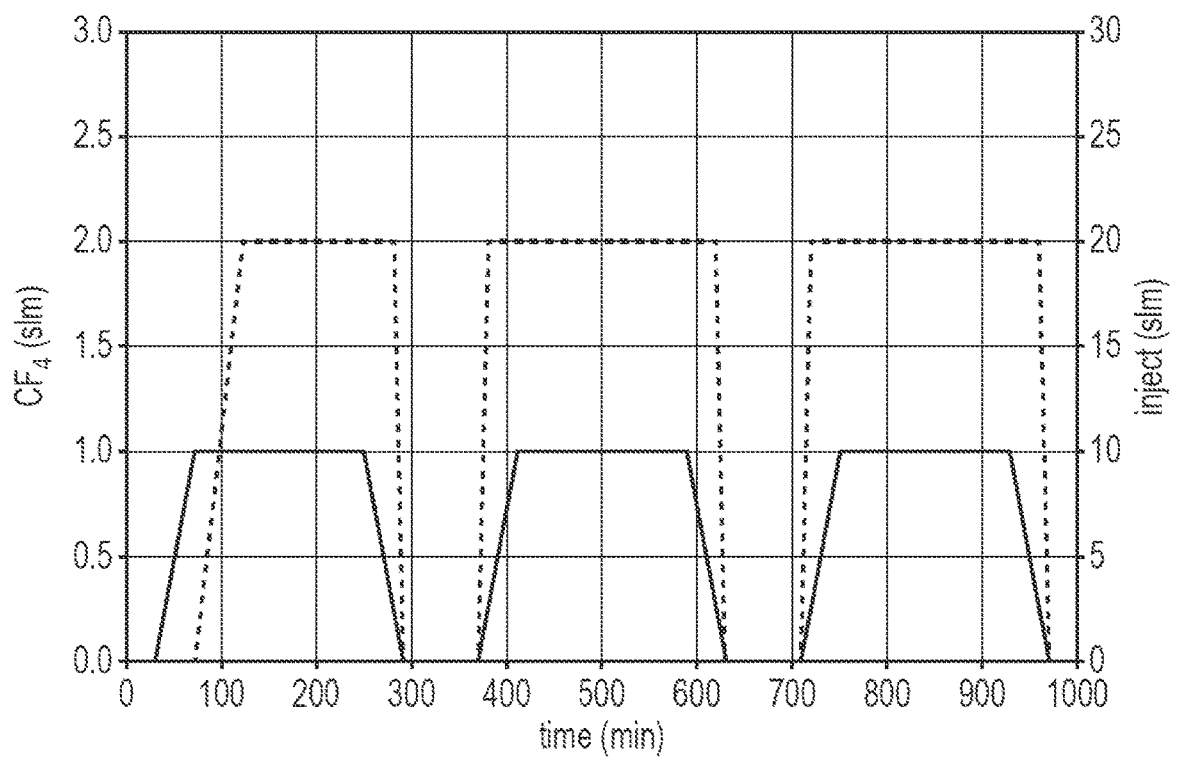
FIG. 8 is a plot of $CF_4$ flow from tool (solid line) and inject $O_2$ flow tracking (dashed line) according to the algorithm (1000 fold dilution, pure $O_2$)
Figure 9:
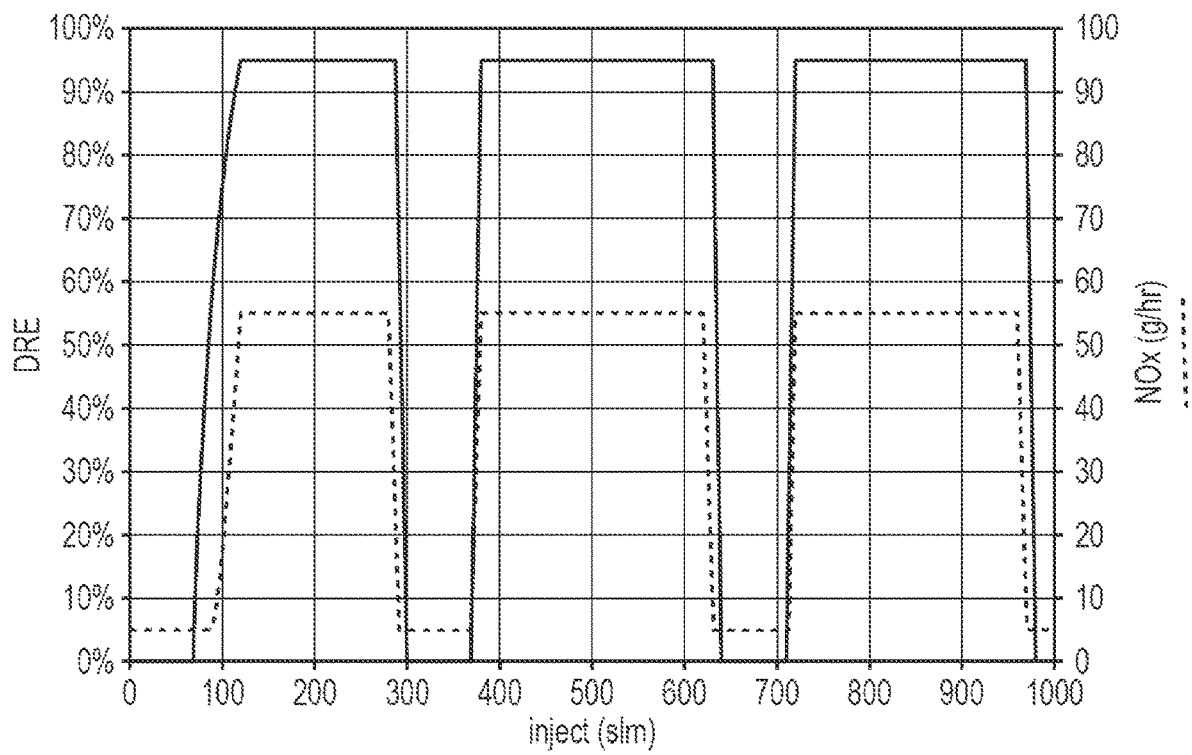
FIG. 9 is as FIG. 8 but showing DRE (solid line) and NOx emissions (dashed line)

FIG. 8 shows a typical time profile of inlet $CF_4$ from a series of etch processes and the corresponding tracking of $O_2$ inject flows using the control algorithm—by storing the last best historic value this can be used to expedite finding a solution. After the solution has been found on the first etch cycle the inject flows on subsequent steps are set to their optimum flows quickly and the resulting 95% $CF_4$ DRE and low NOx achieved in a timely fashion as shown in FIG. 9.

Figure 10:
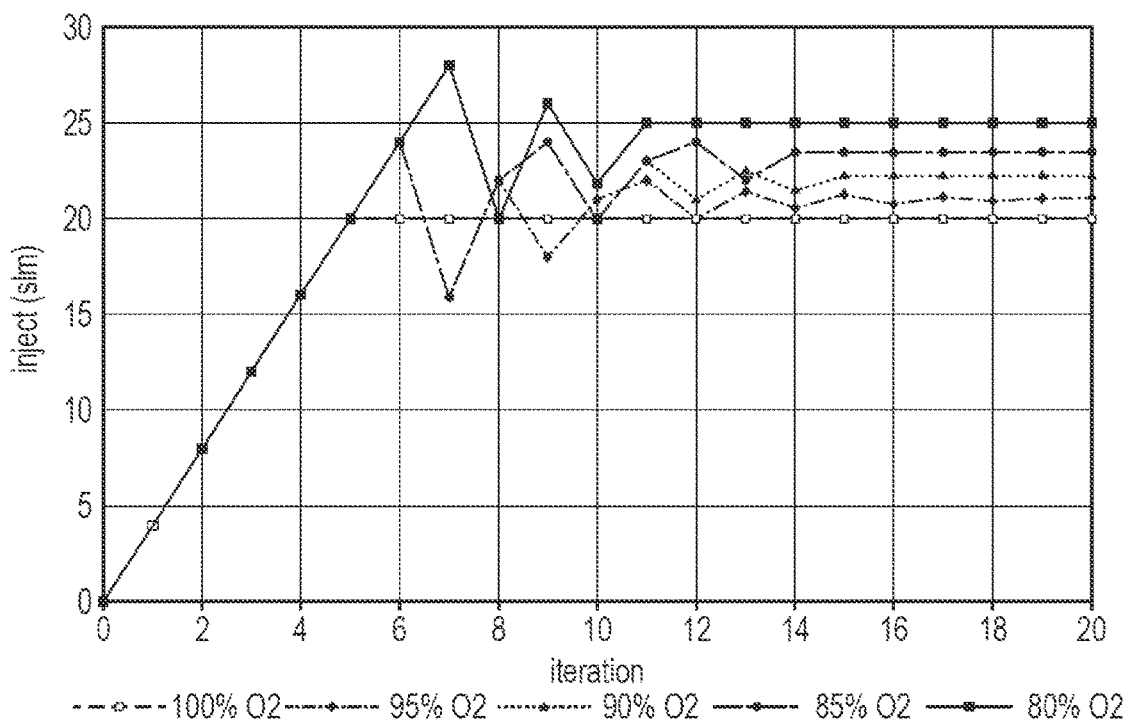
FIG. 10 is a plot showing $O_2$ inject flow vs number of iterations of the computer algorithm to find a solution for optimum inject flow at 95% DRE for 1 SLM of $CF_4$ at a dilution factor of 1000 with different purities of $O_2$ indicated.

Many semiconductor fabricators obtain their supply of oxygen from air separation plants—usually pressure swing adsorption systems. The purity of the oxygen is typically 90-95% and of unknown and variable quality. If the abatement apparatus was always supplied with oxygen of constant purity the system could be arranged to inject the same amount of $O_2$ each time $CF_4$ was flowing to achieve the desired performance and it would not be necessary to employ exhaust monitoring to derive the optimum flow. This almost never occurs in practice so this method of adjusting injected (impure) $O_2$ flow in response to the concentration of CF4 in the exhaust helps to overcome this issue. As an illustration, the results from inputting different levels of $O_2$ purity into the search to achieve 95% DRE for 1 SLM of CF4 at 1000-fold system dilution starting from no initial flow are shown in FIG. 10.

Also, in another embodiment, instead of adjusting the oxygen inject flow for a fixed fuel inject flow, the oxygen inject flow could be fixed and the fuel inject flow adjusted.

A similar method could also be applied to a plasma abatement device. Instead of adjusting oxygen or fuel inject flow to adjust the combustion conditions, the inject flow of a reagent such as air, and/or the electrical power to the plasma, may be adjusted in response to the PFC exhaust sensor measurement.

In order to learn over a sequence of wafers, if a digital signal for PFC flow "on" is not available, the presence of the PFC exhaust gas sensor signal (above any background noise level) could be used to detect when the PFC gas is flowing, and thus to determine when to start and stop measuring the PFC emission level.

Oxidant Supply

Although the oxidant provided to the abatement apparatus 10 may come from a pure oxygen source, in one embodiment an "oxygen-enriched air source" is provided. In particular, the oxygen enriched air typically comprises 85%-95% oxygen with the balance nitrogen. This can be generated from air at lower cost and is safer than having a pure oxygen supply. In this case, instead of adjusting the oxygen inject flow, the "oxygen enriched air" inject flow may be fixed, and the oxygen concentration adjusted by dilution with nitrogen (or enrichment with pure oxygen).

In one embodiment, it is determined that pure oxygen inject has an optimum flow rate per nozzle to get $CF_4$ DRE>95% and minimise NOx of 17 slm per nozzle.

If the pre-mix inject flow is set to 20 SLM per nozzle (using a standard flow regulator), and the oxygen supply is always diluted to a concentration of 85%, this should achieve an optimum condition.

Then using a measurement of oxygen concentration, and knowing how many injects are required, a single 20 SLM nitrogen mass flow controller (MFC) could be used to add the required amount of nitrogen to dilute the oxygen enriched air for 6 nozzles to 85% $O_2$ (rather than using the 6 MFCs).

Example: required $O_2$ per nozzle 17 SLM, measured oxygen concentration 95%, target concentration 85%, 6 injects active:

Set pre-mix inject flow per nozzle to 17/0.85=20 SLM
Require 6×17=102 SLM of oxygen over 6 nozzles
This requires 102/0.95=107.4 SLM of oxygen enriched air at 95% concentration
So add 120−107.4=13.6 SLM of nitrogen More generally: required O2 per nozzle is A SLM, measured oxygen concentration is y %, target concentration is x % and n injects active:

Set pre-mix inject flow per nozzle to A/x SLM (constant)
Require nA SLM of oxygen over n nozzles
This requires nA/y SLM of oxygen enriched air at y % concentration
So add (nA/x−nA/y)=(nA/x)·(1−x/y) SLM of nitrogen Assuming a MFC accuracy of 1% full scale (0.2 SLM of N2): Worst case error is if only one inject is active, when the oxygen flow could be out by 0.2 SLM=1.1% of 17 SLM. So error is no worse than using individual MFCs for each inject (and better when multiple injects are on).

Accordingly, embodiments provide a method to optimise PFC abatement using an exhaust gas sensor. A sensor in the exhaust of a thermal abatement system measures the concentration of a PFC gas being abated, and may also measure other by-products. The sensor signal is used to adjust the conditions in the abatement unit, and the sensor response to the adjustment is used to determine the optimum setting that achieves sufficient abatement, while minimising the generation of undesirable by-products such as NOx.

Although illustrative embodiments of the invention have been disclosed in detail herein, with reference to the accompanying drawings, it is understood that the invention is not limited to the precise embodiment and that various changes and modifications can be effected therein by one skilled in the art without departing from the scope of the invention as defined by the appended claims and their equivalents.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

Appendix—program listing to find optimum abatement conditions

```
10 REM program to demonstrate optimisation of oxygen inject for CF4 abatement
20 REM using (simulated) measurement of CF4 concentration in exhaust
30 REM with lowest use of resources and emissions of NOx (simulated)
40
50 REM control algorithm requires CF4 flow (from tool) and
60 REM knowledge of the dilution factor of the gas leaving the exhaust
70 REM in order to calculate desired CF4 concentration there
80 REM which achieves specified destruction rate efficiency (DRE)
90
100 REM input conditions
110 REPEAT
120 REM only accept values 0-100%
130 INPUT "Target DRE (%)"; DRE %
140 UNTIL (DRE %>=0) AND (DRE %<=100)
150
160 INPUT "Dilution factor"; dilution_factor
170
180 REM initialise historic best value (of inject flow to store for future use
190 LET last_best_inject=0
200
210 REPEAT
220
230 REM get CF4 flow (this would be from tool)
240 INPUT "CF4 flow (slm)"; CF4_flow
250
260 REM calculate CF4 concentration in ppm at required DRE
270 LET target %=(CF4_flow*(100−DRE %)/100/dilution_factor*1E6)
280
290 REM step size for changing inject
300 LET step_inject=4
310
320 REM get starting inject
330 INPUT "Initial O2 inject flow (slm)"; old_inject
340
350 REM use last_best_inject if starting point negative
360 REM back it off by the step size to force search to converge after one iteration
370 IF (old_inject<0) THEN LET old_inject=last_best_inject−step_inject
380
390 REM get O2 purity in range 80-100%
400 REM (this would be unknown in practice-
410 REM ca.90-95% from industrial pressure swing adsorption generators)
420 REPEAT
430 INPUT "O2 purity (80-100%)"; O2_purity
440 UNTIL (O2_purity>=80) AND (O2_purity<=100)
450
460 REM initialise starting CF4 concentration in exhaust
470 LET old_conc %=FNmeasure_CF4(old_inject)
480 PRINT "current inject (slm): ";old_inject;", CF4 (ppm): ";old_conc %;", inject step (slm): ";step_inject;" NOx (g/hr):"+STR$(FNmeasure_NOx(inject))
490
500 REM main loop to find solution
510 REPEAT
520
530 REM done % is Boolean flag to denote that we've already dealt with each case (it avoids GOTO statements)
540 LET done %=FALSE
550
560 IF (CF4_flow=0) THEN
570 REM turn inject off, no CF4 to treat
580 LET old_inject=0
590 REM make step_inject zero
600 LET step_inject=0
610 PRINT "Inject off"
620 REM set flag to show we've accepted new conditions
```

630 LET done %=TRUE
640 ENDIF
650
660 REM measure CF4 concentration at provisionally better inject
670 LET new_inject=old_inject+step_inject
680 REM trap negative values
690 IF (new_inject<0) THEN LET new_inject=0
700 REM measure at new inject setting
710 LET new_conc %=FNmeasure_CF4(new_inject)
720 REM display result
730 PRINT "CF4 new (ppm): ";new_conc %;", target (ppm):";target %
740
750 IF (done %=FALSE) THEN
760 REM we are too low but going the right way
770 IF (new_conc %>=target %) AND (new_conc %<old_conc %) THEN
780 REM accept new inject
790 REM set flag to show we've accepted new conditions
800 LET done %=TRUE
810 ENDIF
820 ENDIF
830
840 IF (done %=FALSE) THEN
850 REM are too high but going the right way
860 IF (step_inject<0) AND (new_conc %=<target %) THEN
870 REM accept new inject
880 REM set flag to show we've accepted new conditions
890 LET done %=TRUE
900 ENDIF
910 ENDIF
920
930 REM check to see if either of the above changes have reached the target
940 REM don't make any further changes to the inject in that case
950 IF (done %=TRUE) AND (new_conc %=target %) THEN
960 IF (step_inject>0) AND (new_conc %<old_conc %) THEN LET step_inject=0
970 IF (step_inject<0) AND (new_conc %>old_conc %) THEN LET step_inject=0
980 ENDIF
990
1000 IF (done %=FALSE) THEN
1010 REM we are much too high but going right way
1020 IF (step_inject<0) AND (new_conc %<old_conc %) THEN
1030 REM accept new inject
1040 REM set flag to show we've accepted new conditions
1050 LET done %=TRUE
1060 ENDIF
1070 ENDIF
1080
1090 REM if we've accepted the change in inject so far then store new_conc in old_conc
1100 IF (done %=TRUE) THEN
1110 LET old_conc %=new_conc %
1120 LET old_inject=new_inject
1130 REM print status on screen
1140 PRINT "Change accepted!"
1150 ENDIF
1160
1170 REM now consider cases where we are changing the inject in the wrong direction
1180
1190 IF (done %=FALSE) THEN
1200 REM abatement too good, in region DRE better than required
1210 IF (new_conc %<target %) THEN
1220 REM decrease inject by making step_inject negative
1230 LET step_inject=ABS(step_inject)*−1
1240 REM print status on screen
1250 PRINT "Change rejected! Decreasing inject"
1260 REM set flag to show we've accepted new conditions
1270 LET done %=TRUE
1280 ENDIF
1290 ENDIF
1300
1310 IF (done %=FALSE) THEN
1320 REM much too high, abatement getting worse again as inject is increased
1330 IF (step_inject>0) AND (new_conc %>old_conc %) THEN
1340 REM decrease inject by making step_inject negative
1350 LET step_inject=ABS(step_inject)*−1
1360 REM print status on screen
1370 PRINT "Change rejected! Decreasing inject"
1380 REM set flag to show we've accepted new conditions
1390 LET done %=TRUE
1400 ENDIF
1410 ENDIF
1420
1430 IF (done %=FALSE) THEN
1440 REM we are too low and going the wrong way
1450 IF (step_inject<0) AND (new_conc %>old_conc %) AND (new_conc %>target %) THEN
1460 REM increase inject more slowly by reducing size of step_inject
1470 LET step_inject=ABS(step_inject/2)
1480 REM print status on screen
1490 PRINT "Change rejected! Increasing inject more slowly"
1500 REM set flag to show we've accepted new conditions
1510 LET done %=TRUE
1520 ENDIF
1530 ENDIF
1540
1550 IF (done %=FALSE) THEN
1560 REM none of the above apply
1570 REM print status on screen
1580 PRINT "Something amiss! Reducing search window"
1590 REM reduced step size
1600 LET step_inject=step_inject/2
1610 ENDIF
1620
1630 REM print status of algorithm on screen and to file
1640 PRINT "current inject: ";old_inject;" slm, CF4: ";old_conc %;" ppm, inject step: ";step_inject;" slm, NOx: ";FNmeasure_NOx(old_inject);" g/hr"
1650
1660 REM wait for a second
1670 WAIT(100)
1680
1690 REM stop when either we've found a solution or the step_size is very small
1700 UNTIL (ABS(step_inject)<0.01)
1710
1720 REM check to see if target achieved
1730 IF (old_conc %=target %) THEN 1740 REM solution found
1750 PRINT"Target DRE achieved!"
1760 REM store this in last_best_inject
1770 LET last_best_inject=old_inject
1780 ENDIF
1790
1800 REM check to see if target not achieved
1810 IF (old_conc %< >target %) THEN
1820 PRINT "Failed to achieve target!"
1830 ENDIF
1840
1850 REM ask if another condition to be tested
1860 REPEAT
1870 INPUT "Do another (Y/N)"; reply$
1880 REM concentate to first character
1890 LET reply$=LEFT$(reply$,1)
1900 REM only accept Y/y or N/n
1910 UNTIL (reply$="N") OR (reply$="n") OR (reply$="Y") OR (reply$="y")
1920
1930 UNTIL (reply$="N") OR (reply$="n")
1940
1950 END
1960
1970 DEF FNmeasure_CF4(inject)
1980 REM this is a proxy for actual measurement on exhaust
1990 PRINT "Inject:";inject;
2000 REM accommodate purity of oxygen
2010 LET inject=inject*O2_purity/100
2020 PRINT; "slm, O2 content: ";inject;" slm"
2030 REM calculate DRE from model
2040 LET DRE_actual=−0.000000292*inject^4+ 0.0000525=inject^3−0.003520833=inject^2+ 0.09925*inject
2050 REM print DRE rounded up to nearest whole number
2060 PRINT "DRE: ";INT(DRE_actual*100+0.5)"%";
2070 REM calculate amount of CF4 in slm in exhaust
2080 LET CF4_out=CF4_flow*(1−DRE_actual)
2090 REM return concentration in exhaust in ppm
2100 REM rounded to nearest whole number
2110=INT((CF4_out/dilution_factor*1E6)+0.5)
2120
2130 DEF FNmeasure_NOx(inject)
2140 REM this is a proxy for actual measurement on exhaust
2150 REM accommodate purity of oxygen
2160 LET inject=inject*O2_purity/100
2170 REM calculate NOx from model
2180 IF (inject<10) THEN LET NOx=5
2190 IF (inject>=10) THEN LET NOx=5*(inject−10)+5
2200 REM round to nearest whole number
2210=INT(NOx+0.5)

The invention claimed is:

1. A method of optimising operating conditions in an abatement apparatus configured to treat an effluent stream containing PFC from a processing tool, said method comprising:
  changing an operating parameter which controls an operating condition of said abatement apparatus;
  determining a change in a PFC concentration by measuring a PFC concentration present in an exhaust stream of said abatement apparatus; and
  determining whether to retain said operating parameter based on said change in said PFC concentration.

2. The method of claim 1, wherein said changing comprises adjusting said operating parameter from an initial operating parameter to an adjusted operating parameter.

3. The method of claim 2, wherein said determining said change comprises determining an initial PFC concentration present in said exhaust stream and a resultant PFC concentration present in said exhaust stream in response to said adjusted operating parameter.

4. The method of claim 1, wherein said operating condition comprises one of an operating temperature and oxidising/reducing environment of said abatement apparatus.

5. The method of claim 3, wherein, when said adjusted operating parameter increases said operating temperature and said resultant PFC concentration is below said initial PFC concentration, but said resultant PFC concentration is above a threshold concentration, said determining comprises retaining said adjusted operating parameter.

6. The method of claim 3, wherein:
  adjusting the operating parameter comprises decreasing an operating temperature;
  determining a change in the PFC concentration comprises determining that said resultant PFC concentration is above said initial PFC concentration, and that said resultant PFC concentration is above a threshold concentration; and
  determining whether to retain said operating parameter comprises one of rejecting said adjusted operating parameter and preventing further changing of said operating parameter to decrease said operating temperature.

7. The method of claim 1, wherein said abatement apparatus comprises an abatement chamber and said operating parameter comprises at least one of a power supplied to heat said abatement chamber, a plasma supplied to said abatement chamber and a oxidant/fuel amount supplied to said abatement chamber.

8. The method of claim 7, wherein, when said operating parameter comprises said oxidant/fuel amount, said changing comprises decreasing said oxidant/fuel amount, said resultant PFC concentration is below said threshold concentration and said resultant PFC concentration is less than said initial PFC concentration, said determining comprises reducing said oxidant/fuel amount while said resultant PFC concentration passes through a minimum value.

9. The method of claim 6, wherein said rejecting comprises changing said operating parameter back to said initial operating parameter, and/or wherein said rejecting comprises changing said operating parameter to a value between said initial operating parameter and said adjusted operating parameter, and/or wherein, when said operating parameter comprises said oxidant/fuel amount and said abatement apparatus is supplied by an enriched air source augmented by at least one of an oxygen and nitrogen source, said changing comprises adjusting at least one of said oxygen and nitrogen source to adjust said oxidant/fuel amount.

10. The method of claim 1, comprising iteratively repeating said steps of changing and determining.

11. The method of claim 1, wherein said determining comprises determining said initial PFC concentration in response to an indication being received which indicates that PFC is present in said effluent stream.

12. The method of claim 1, comprising identifying a PFC concentration profile of a processing cycle prior to said changing.

13. The method of claim 12, comprising, when said PFC concentration profile deviates by greater than a maximum deviation amount, said changing occurs in subsequent processing cycles.

14. The method of claim 12, comprising, when said PFC concentration profile deviates by greater than said maximum deviation amount, selecting a time within each processing cycle to determine said change in said PFC concentration present in said exhaust stream.

15. An abatement apparatus configured to treat an effluent stream containing PFC from a processing tool, comprising:
a controller operable to change an operating parameter which controls an operating condition of said abatement apparatus;
a sensor operable to determine a change in a PFC amount present in an exhaust stream of said abatement apparatus, wherein said controller is operable to determine whether to retain said operating parameter based on said change in said PFC amount present in said exhaust stream determined by said sensor.

16. The method of claim 3, wherein:
adjusting the operating parameter comprises increasing an operating temperature;
determining a change in the PFC concentration comprises determining that said resultant PFC concentration is below said initial PFC concentration; and
determining whether to retain said operating parameter comprises one of rejecting said adjusted operating parameter and preventing further changing of said operating parameter to increase said operating temperature.

17. The method of claim 3, wherein:
adjusting the operating parameter comprises decreasing an operating temperature;
determining a change in the PFC concentration comprises determining that said resultant PFC concentration is above said initial PFC concentration, but said resultant PFC concentration is below a threshold concentration; and
determining whether to retain said operating parameter comprises retaining said adjusted operating parameter.

18. The method of claim 7, wherein said operating parameter comprises said oxidant/fuel amount supplied to said abatement chamber, wherein,
adjusting the operating parameter comprises increasing said oxidant/fuel amount;
determining a change in the PFC concentration comprises determining that said resultant PFC concentration is above said initial PFC concentration; and
determining whether to retain said operating parameter comprises reducing said oxidant/fuel amount while said resultant PFC concentration passes through a minimum value.

19. The method of claim 7, wherein said operating parameter comprises said oxidant/fuel amount supplied to said abatement chamber, wherein,
adjusting the operating parameter comprises increasing said oxidant/fuel amount;
determining a change in the PFC concentration comprises determining that said resultant PFC concentration is above said initial PFC concentration and said resultant PFC concentration is above a threshold amount; and
determining whether to retain said operating parameter comprises reducing said oxidant/fuel amount while said resultant PFC concentration passes through a minimum value.

20. The method of claim 7, wherein said operating parameter comprises said oxidant/fuel amount supplied to said abatement chamber, wherein,
adjusting the operating parameter comprises decreasing said oxidant/fuel amount;
determining a change in the PFC concentration comprises determining that said resultant PFC concentration is below said initial PFC concentration; and
determining whether to retain said operating parameter comprises reducing said oxidant/fuel amount while said resultant PFC concentration passes through a minimum value.

* * * * *